Aug. 28, 1956    F. H. KEAST    2,760,338
ANNULAR COMBUSTION CHAMBER FOR GAS TURBINE ENGINE
Filed Jan. 29, 1953    3 Sheets-Sheet 1

INVENTOR
F. H. KEAST

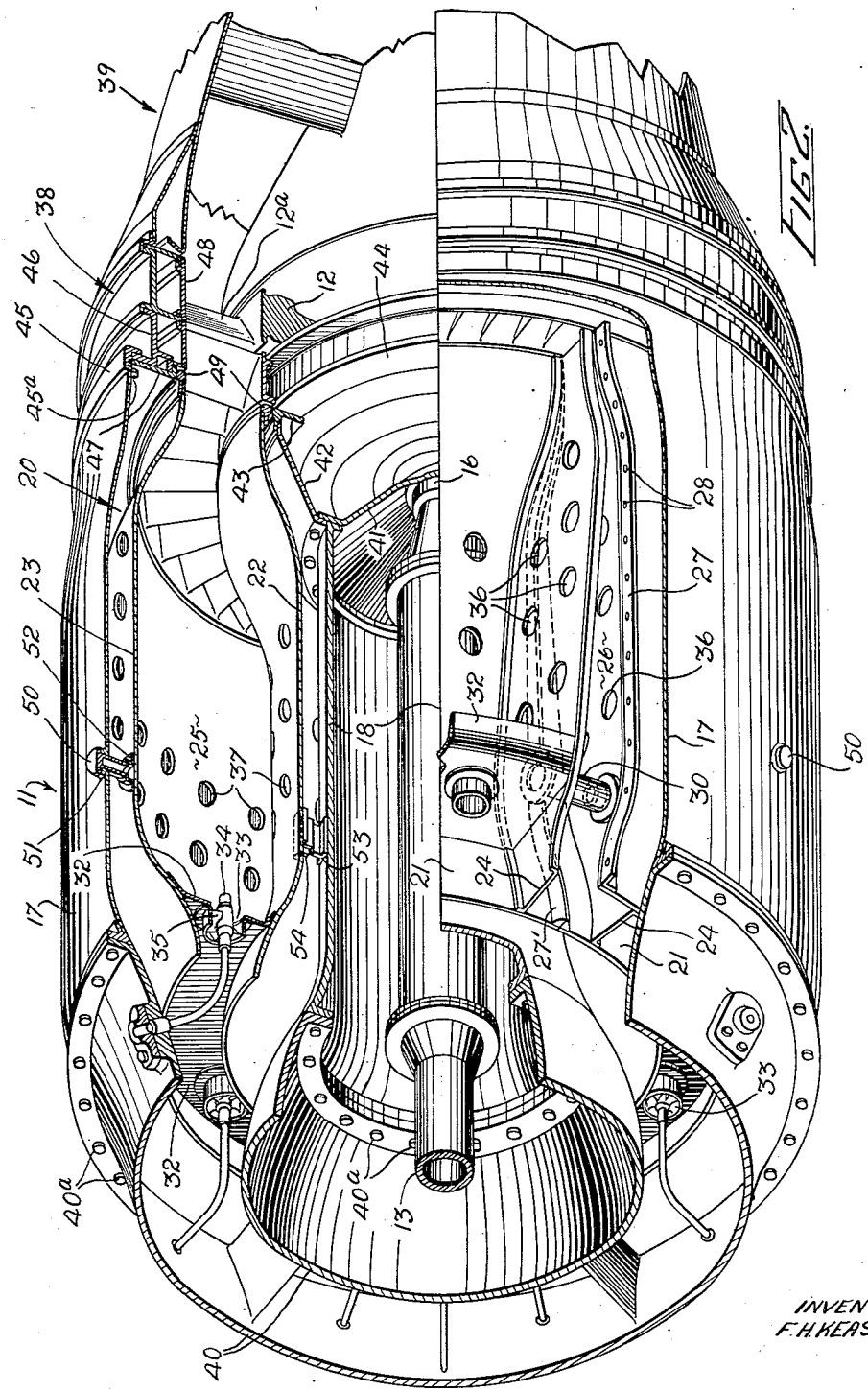

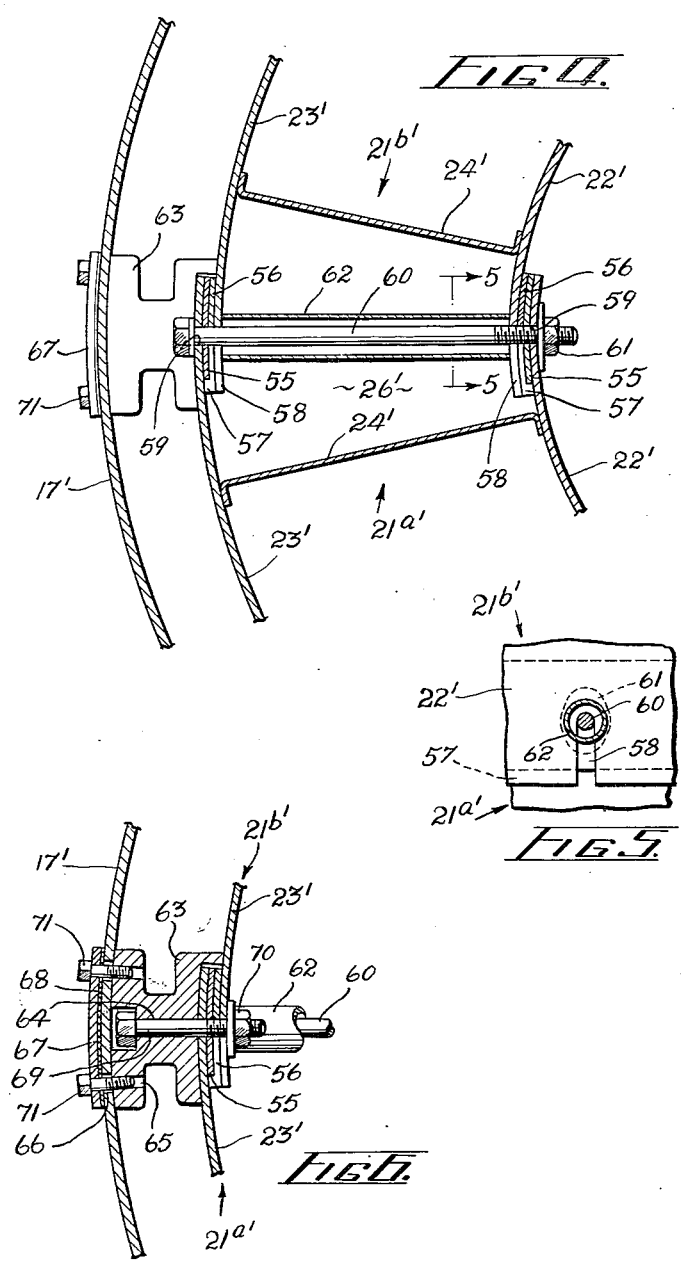

United States Patent Office 2,760,338
Patented Aug. 28, 1956

2,760,338

ANNULAR COMBUSTION CHAMBER FOR GAS TURBINE ENGINE

Francis Henry Keast, Toronto, Ontario, Canada, assignor to A. V. Roe Canada Limited, Ontario, Canada, a corporation Application January 29, 1953, Serial No. 333,864

Claims priority, application Canada February 2, 1952

13 Claims. (Cl. 60—39.36)

This invention relates to improvements in an annular combustion chamber for a gas turbine engine.

In the past the combustion systems of gas turbine engines, particularly of those intended for installation in aircraft, have conventionally taken the form of a group of tube type combustion chambers annularly arranged about the axis of the engine. In recent years however increasingly wider use has been made of annular combustion chambers having casings of unitary construction lined by annular flame tubes.

The annular combustion chamber has decided advantages over the tube type as regards reduction of pressure losses during combustion and reduced overall diameter for a given mass flow, but suffers the disadvantage of being difficult to strip down and re-assemble.

Accordingly, it is the principal object of this invention to provide an annular combustion chamber which is easily accessible and easily assembled and dismantled.

It is another object of the invention to provide means for mounting in an annular combustion chamber casing the elements of an annular flame tube which is divided longitudinally into two or more elements.

It is a further object of the invention to provide means for cooling the interfaces between adjacent elements of an annular flame tube which is divided longitudinally into two or more elements.

In the accompanying drawings which form a part of this specification and in which like reference characters denote like parts throughout the several views:

Figure 2 is an enlarged perspective view, partly sectioned, of the combustion chamber, turbine, and adjacent structures of the engine shown in Fig. 1;

Figure 4 is a further enlarged fragmentary sectional view showing alternative means for joining together two elements of an annular flame tube and for attaching the flame tube to the outer casing of an annular combustion chamber;

Figure 5 is a sectional view taken on the plane of the line 5—5 in Figure 4; and Figure 6 is a sectional view showing in greater detail the alternative means for attaching the flame tube to the outer casing of the combustion chamber.

Figure 1:
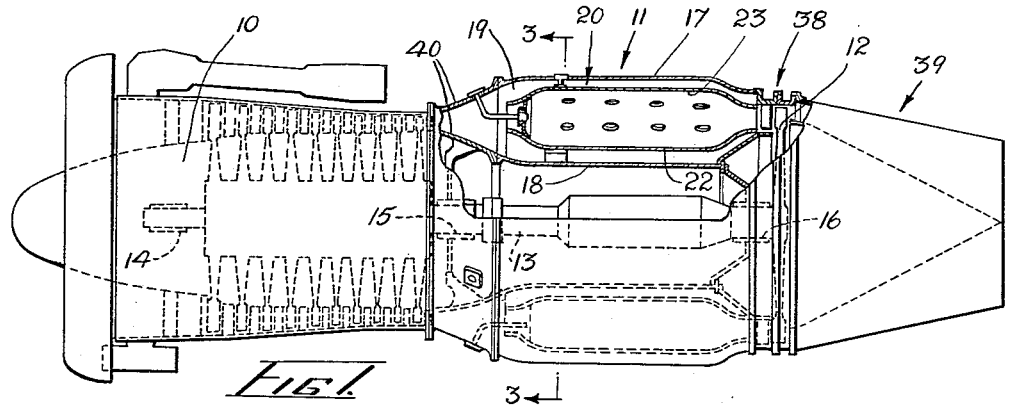
Figure 1 is a side view, partly sectioned, of a gas turbine engine embodying an annular combustion chamber constructed and arranged in accordance with the invention.

The engine illustrated in the drawings is of the axial flow type with a compressor 10, a combustion system generally indicated as 11 and a turbine assembly 12 mounted in serial relationship along a common axis. The compressor and the turbine are connected by a shaft 13 which is supported in front, main, and rear bearings 14, 15 and 16 respectively.

Figure 3:
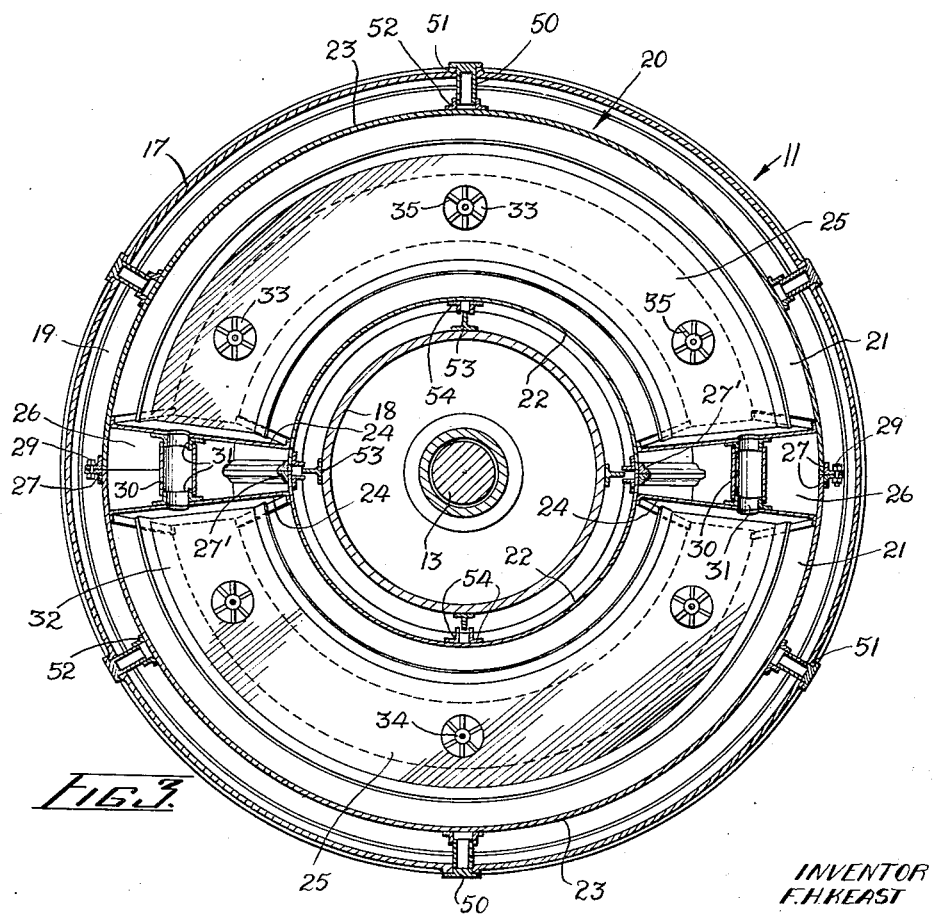
Figure 3 is an enlarged sectional view taken on the plane of the line 3—3 in Figure 1.

An annular outer casing 17 and an annular inner casing 18 are coaxially mounted around the shaft 13 to define an annular combustion chamber 19. This chamber contains an annular flame tube generally indicated as 20; the flame tube is coaxial with the casings 17 and 18 and is divided longitudinally into two discrete halves or elements 21 which in transverse cross-section (Figure 3) are annulus sectors. Each of these halves is formed with a substantially semi-cylindrical inner wall 22 and a similar outer wall 23. Two substantially longitudinal partitions 24 extend radially between these walls near the longitudinal edges of each element, maintaining the proper radial spacing between the walls. The walls and the partitions together define a substantially semi-annular combustion zone 25 in each element. The partitions are not mounted at the very edges of the walls 22 and 23, but are spaced from the edges, converging with the edges at their downstream extremities so that when the two halves of the flame tube are assembled to form the complete annulus, adjacent pairs of partitions form longitudinal passages 26 the cross-sectional areas of which decrease progressively towards their downstream ends, which are closed. Attachment of the two halves of the flame tube to each other is effected by means of radially extending flanges 27 which are fixed to the exterior surface of the outer wall 23 of each half along its longitudinal edges; these flanges contain a series of holes 28 into which attachment bolts 29 are fitted. The edges of the inner walls 22 of the two halves of the flame tube carry beads or flanges 27' which are not positively joined but simply butt together when the flanges 27 on the outer walls are secured. With the two halves of the flame tube in the assembled position, communication between the respective combustion zones 25 is provided by means of interconnector tubes 30 which are fitted to sockets 31 in the partitions 24, each of the sockets giving access to the interior of its respective flame tube. The forward end of each half of the flame tube, between the partitions 24, is closed by a transverse baffle 32 in which there is a series of openings 33 at spaced intervals for the admission of primary air to the combustion zones 25; fuel nozzles 34 are supported centrally within each of these openings on swirl vanes 35. The forward ends of the passages 26 are not closed, and provision for the admission of secondary air to the combustion zones is made by holes 36 in the partitions and by further holes 37 in both the inner and outer walls of the flame tube.

The problem of mounting the combustion chamber and flame tube in the engine is complex, partly because the flame tube mountings must permit thermal expansion of the flame tube, and partly because the outer and inner casings 17 and 18 must carry the weight of the turbine stator assembly generally indicated as 38, and the tail cone generally indicated as 39. The combustion chamber is supported at its forward or upstream end by a diffuser casing 40 which also supports the main bearing 15, attachment of the outer and inner casings 17 and 18 to the diffuser casing being effected by peripheral rows of bolts 40a. The rear or downstream end of the inner casing 18 supports an inwardly extending frusto-conical member 41 on which the rear bearing 16 is mounted and it also supports an outwardly extending frusto-conical member 42 which carries a circular stiffening flange 43 as well as a turbine stator blade inner mounting ring 44. The downstream end of the outer casing 17 has a flanged portion 45 which is secured by bolts 45a to a turbine stator blade outer mounting ring 46 and a stiffening flange 47; the outer mounting ring supports a turbine shroud ring 48 and the tail cone 39.

The downstream end of the flame tube is supported and restrained from radial movement on the two stiffening flanges 43 and 47, beading 49 being provided on the inner and outer surfaces of the inner and outer flame tube walls respectively to permit limited relative movement in the longitudinal direction. At its upstream end, the flame tube is held by a series of radial and inwardly projecting suspension tubes 50 symmetrically spaced around the outer casing 17. The suspension tubes extend through bossed-up holes 51 in the casing, and the tubes have flanged heads which butt against the bosses. The inner ends of the suspension tubes fit slidingly into sockets 52 fixed to the exterior surface of the flame tube outer wall 23. The inner casing 18 is provided with a set of T-shaped flanges 53 which are attached in regular spacing around its outer surface, the flanges being mounted with the webs of the T's projecting radially. L-shaped flanges 54 are mounted in pairs on the adjacent surface of the flame tube inner wall as shown in the drawings and register with the projecting webs of the T-shaped flanges 53. These flanges ensure that the flame tube is properly oriented to allow the sockets 52 to be picked up by the suspension tubes 50 when the outer casing 17 has been installed. It should be noted that although the flame tube assembly is supported on the inner casing by the flanges 53 when the engine is cold, the flame tube will expand under operating temperatures, pulling the flame tube inner wall out of contact with the T-shaped flanges 53 so that the whole of the flame tube's weight is carried by the suspension tubes 50.

When the engine is in operation, air is drawn into the compressor 10 where it is compressed and passed on to the combustion system 11 where fuel is added, the resulting mixture being burned and exhausted rearwardly through the turbine 12 which drives the compressor 10. Air entering the combustion chamber 19 from the compressor is divided into two portions: primary air which enters the flame tube 20 through the openings 33 in the baffles 32, and secondary air which enters the flame tube through the holes 36 and 37 and provides cooling of the walls 22 and 23 of the flame tube and of the partitions 24. The partitions separate the combustion zones 25 from the joints between the halves of the flame tube and protect the joints from distortion and from possible leakage. The primary air is given turbulence by the swirl vanes 35 in order to provide better mixing with the fuel injected by the nozzles 34. An igniter (not shown) is provided to initiate combustion, but since the combustion process is self-sustaining the igniter may be turned off once the "lighting up" operation has been effected. The interconnector tubes 30 provide a direct connection between the combustion zones of the two halves 21 of the flame tube assembly, so that if ignition in one half should fail the flame in that half will be transmitted to the idle half. The secondary air which enters the passages 26 through the forward end of the combustion chamber is discharged into the flame zone through the holes 36, thereby cooling the partitions and preventing them burning out. At the downstream end of the combustion chamber the converging partitions meet, closing the passages 26 and presenting the combustion zones 25 as a virtually complete annulus before the turbine stator blades.

If the combustion chamber is to be dismantled for some reason, the bolts 45a holding the flanged portion 45 at the downstream end of the outer casing 17 to the outer mounting ring 46, and the bolts 40a holding the upstream end of the casing to the diffuser casing 40 are unfastened, the suspension tubes 50 also being removed from their sockets 52. The outer casing 17 is then slid rearwardly over the turbine stator assembly 38 and the tail cone 39 to give access to the flame tube 20. The connections to the fuel nozzles 34 are then undone and the bolts 29 in the longitudinal flanges 27 removed so that either half of the flame tube may be taken out by sliding the flame tube forwardly to release the beading 49 from the stiffening flanges 43 and 47 and to disengage the T-shaped flanges 53 from the registering flanges 54. In assembling the combustion chamber the foregoing process is reversed.

It will be observed that the turbine stator blade assembly must be strong enough to transmit the load of the tail cone 39 to the inner casing 18 when the outer casing 17 is removed; the provisions made in the turbine stator assembly 38 for radial expansion of the stator blades and for differential longitudinal expansion between the outer and inner casings 17 and 18, when the engine is at operating temperatures, are not sufficient to permit contact between the turbine rotor blades 12a and the shroud ring 48 when the outer casing 17 is removed from the cold engine. The engine trunnions (not shown), whereby the engine is mounted in an aircraft or on a handling trolley, are located on the diffuser casing 40, ahead of the outer casing 17, and do not interfere with the rearward removal of the said outer casing.

An alternative construction for the flame tube and its supporting means is shown in Figures 4 to 6. As before, the flame tube is constructed in two halves or elements, generally indicated at 21a' and 21b', each having an inner wall 22', an outer wall 23' and partitions 24', but in this case the radial spacing between the walls of one flame tube element 21a' along its attachment edges is greater than the radial spacing between the walls at the mating edges of the other flame tube element 21b' in order to permit the smaller flame tube element 21b' to slide into the large one 21a' as shown in Figure 4, forming passages 26' between adjacent partitions as before. Thin strips of metal 55 are seam welded to both the inner and outer walls of the larger flame tube element 21a' on the surfaces thereof facing the passages 26', while other strips 56 each having a radial lip 57 are seam welded to the adjacent surfaces of the walls of the smaller flame tube element 21b', the length of the lips being equal to the thickness of the strips 55. A plurality of slots 58 are provided in the edges of the walls of the smaller flame tube element 21b' and in the strips 56, and a plurality of holes 59 are correspondingly located in the walls of the larger flame tube element 21a' and in the strips 55; upon assemby of the two flame tube elements these holes and slots are in alignment and the elements are held together by a plurality of bolts 60 which pass through the holes and slots and are held in place by plate nuts 61 fastened to the inner wall 22' of the larger flame tube element 21a'. The bolts are sheathed by tubular spacers 62 which separate the walls of the smaller flame tube element 21b'. To fasten the two elements of the flame tube together, the bolts 60 are inserted in the holes 59 of the larger element 21a' and through the spacers 62, and are partially threaded into the plate nuts 61; the smaller element 21b' of the flame tube is then slid into the larger element until the lips 57 of the strips 56 engage the edges of the strips 55, and the bolts are then tightened.

For securing the flame tube to the outer casing 17' of the combustion chamber, H-section blocks 63 are provided between the flame tube and the outer casing at several points along the flame tube where there is no bolt 60 protruding. Each of these H-sections is provided with a recessed centrally disposed hole 64 as well as two rows of radially disposed tapped holes 65 through the outer flanges of the section. Clearance holes 66 are drilled in the outer casing 17' and in a cover plate 67 which is attached to the outer surface of the outer casing, and a gasket 68 is provided between the cover plate and the outer casing to prevent leakage of secondary air. Attachment bolts 69 are inserted in the holes 64 and held in place by plate nuts 70 attached to the inner surface of the outer wall 23' of the smaller flame tube element 21b'. Assembly is effected by bolting the H-sections 63 to the flame tube and then sliding the casing 17' forwardly over the flame tube as previously described; the gasket 68 and cover plate 67 are then fixed in position by bolts 71 threaded into the tapped holes 65 in the H-section, the clearance holes 66 in the outer casing facilitating lining up of the assembly. It should be noted that in this construction the bolts 69 which are used to attach the flame tube to the outer casing also assist in holding the elements of the flame tube together.

It will be apparent that the flame tube may be made up of more than the two elements shown in the drawings, that alternative means of supporting the flame tube in the combustion chamber may be devised, and that other forms of fuel supply may be utilized. Moreover if the outer diameter of the compressor is sufficiently small, the outer casing 17 may be slid forwardly rather than rearwardly for access to the flame tube. It is to be understood, therefore, that the forms of the invention herewith shown and described are to be taken as preferred examples of the same and that various changes may be made in the shape, size and arrangement of the parts without departing from the spirit of the invention or the scope of the subjoined claims.

What I claim as my invention is:

1. An annular combustion chamber through which a stream of fluid is constrained to flow, comprising an annular inner casing, an annular outer casing, an annular flame tube supported between the casings coaxially with the casings and spaced therefrom, the flame tube being divided longitudinally into a plurality of elements defining combustion zones, each element having longitudinal partitions adjacent its longitudinal edges, and attaching means for detachably securing the elements together, the partitions defining longitudinal fluid passages adjacent the longitudinal edges when the elements are secured together.

2. An annular combustion chamber through which a stream of fluid is constrained to flow, comprising an annular inner casing, an annular outer casing, an annular flame tube, means for supporting the flame tube between the casings coaxially with the casings and spaced therefrom, the flame tube being divided longitudinally into a plurality of elements which in transverse cross-section are annulus sectors, and attaching means for detachably securing the elements together, the elements having longitudinal partitions between their inner and outer walls, the walls and partitions defining combustion zones and longitudinal fluid passages between the combustion zones.

3. An annular combustion chamber through which a stream of fluid is constrained to flow, comprising an annular inner casing, an annular outer casing, an annular flame tube supported between the casings coaxially with the casings and spaced therefrom, the flame tube being divided longitudinally into a plurality of elements having longitudinal partitions between their inner and outer walls adjacent the longitudinal edges thereof, each element defining a combustion zone between its partitions, and attaching means for detachably securing the walls of the elements together at their longitudinal edges, the elements when secured together defining longitudinal fluid passages between adjacent partitions and adjacent the attaching means.

4. An annular combustion chamber through which a stream of fluid is constrained to flow, comprising an annular inner casing, an annular outer casing, an annular flame tube supported between the casings coaxially with the casings and spaced therefrom, the flame tube being divided longitudinally into a plurality of elements which in transverse cross-section are annulus sectors, each element having apertured longitudinal partitions adjacent its longitudinal edges and defining a combustion zone between its partitions, attaching means for detachably securing the elements together at their longitudinal edges, the partitions of adjacent elements defining longitudinal fluid passages adjacent the attaching means, said passages being of decreasing cross-sectional area in the direction of fluid flow.

5. An annular combustion chamber through which a stream of fluid is constrained to flow, comprising an annular inner casing, an annular outer casing, an annular flame tube supported between the casings coaxially with the casings and spaced therefrom, the flame tube being divided longitudinally into a plurality of elements which in transverse cross-section are annulus sectors, and attaching means for detachably securing the elements together, the elements defining combustion zones, longitudinal fluid passages between the combustion zones adjacent the attaching means, and fluid connections between the combustion zones.

6. An annular combustion chamber through which a stream of fluid is constrained to flow, comprising an annular inner casing, an annular outer casing, an annular flame tube supported between the casings coaxially with the casings and spaced therefrom, the flame tube being divided longitudinally into a plurality of elements having longitudinal partitions between their inner and outer walls, the partitions and walls defining combustion zones, attaching means for detachably securing the elements together, the partitions and walls of the elements when secured together defining longitudinal fluid passages between the combustion zones adjacent the attaching means, and means connecting the combustion zones.

7. An annular combustion chamber through which a stream of fluid is constrained to flow, comprising an annular inner casing, an annular outer casing, an annular flame tube supported between the casings coaxially with the casings and spaced therefrom, the flame tube being divided longitudinally into a plurality of elements having longitudinal apertured partitions between their inner and outer walls adjacent the longitudinal edges thereof, the partitions and walls defining combustion zones, attaching means for detachably securing the walls of the elements together along their longitudinal edges, the partitions and walls of the elements when secured together defining longitudinal fluid passages adjacent the attaching means and between the combustion zones, said passages being of decreasing cross-sectional area in the direction of fluid flow, and connection means for the combustion zones extending across said passages.

8. A gas turbine engine having a compressor, an annular combustion chamber and a turbine assembly, the combustion chamber comprising an annular inner casing, an annular outer casing, and an annular flame tube supported between the casings coaxially with the casing and spaced therefrom, the flame tube being divided longitudinally into a plurality of elements, attaching means detachably securing the elements together, the outer casing being at least as long as said elements and being slidable axially to permit removal of the elements, when detached, from the combustion chamber.

9. In a gas turbine engine, an annular combustion chamber having an annular inner casing, an annular outer casing, an annular flame tube between the casings and coaxial therewith, a support in which one end of the flame tube is slidable longitudinally, and further supports spaced longitudinally from said support and holding the flame tube away from the casings, said further supports comprising removable means on the outer casing resisting longitudinal movement of the flame tube and means on the inner casing permitting longitudinal movement of the flame tube, removal of said removable means on the outer casing thereby permitting longitudinal movement of the flame tube, the flame tube and its supports being disengageable by such longitudinal movement, the flame tube being divided longitudinally into a plurality of elements which in transverse cross-section are annulus sectors, and attaching means accessible from the outside of the flame tube and detachably securing the elements together.

10. In a gas turbine engine, an annular combustion chamber having an annular inner casing, an annular outer casing, an annular flame tube between the casings and coaxial therewith, a support in which one end of the flame is slidable longitudinally, and further supports spaced longitudinally from said support and holding the flame tube away from the casings, said further supports comprising removable means on the outer casing resisting longitudinal movement of the flame tube and means on the inner casing permitting longitudinal movement of the flame tube, removal of said removable means on the outer casing thereby permitting longitudinal movement of the flame tube, the flame tube and its supports being disengageable by such longitudinal movement, the outer casing also being slidable longitudinally for access to the flame tube upon removal of said removable means, the flame tube being divided longitudinally into a plurality of elements, and attaching means detachably securing the elements together and accessible from the outside of the flame tube.

11. An annular combustion chamber as claimed in claim 2, in which the longitudinal partitions affix the inner wall of each element to the outer wall whereby when the elements are detached they are removable as separate units from the combustion chamber.

12. An annular combustion chamber as claimed in claim 11, in which the attaching means are located at and are accessible from the outside of the flame tube whereby the elements can be detached from the outside of the flame tube.

13. An annular combustion chamber as claimed in claim 12, in which the means for supporting the flame tube between the casings comprises a support from which the flame tube is disengageable by longitudinal movement, and removable support means on the outer casing, accessible from the outside of the flame tube, and resisting longitudinal movement of the flame tube, removal of said removable support means thereby permitting longitudinal movement of the flame tube to disengage the support and permit removal of the tube elements.

References Cited in the file of this patent
UNITED STATES PATENTS

| | | |
|---|---|---|
| 2,477,683 | Birmann | Aug. 2, 1949 |
| 2,618,120 | Papini | Nov. 18, 1952 |
| 2,640,319 | Wislicenus | June 2, 1953 |
| 2,674,090 | Highberg | Apr. 6, 1954 |
| 2,676,459 | Marchant | Apr. 27, 1954 |
| 2,699,040 | Gaubatz | Jan. 11, 1955 |